United States Patent [19]
Huning

[11] Patent Number: 5,803,939
[45] Date of Patent: Sep. 8, 1998

[54] INDUSTRIAL DUST COLLECTOR AND METHOD FOR ITS USE

[75] Inventor: Leon A. Huning, Morrill, Kans.

[73] Assignee: Alanco Environmental Resources Corp., Scottsdale, Ariz.

[21] Appl. No.: 839,985

[22] Filed: Apr. 24, 1997

[51] Int. Cl.$^6$ .................................................. B01D 46/48
[52] U.S. Cl. .......................... 55/369; 55/341.4; 55/341.6; 55/341.7; 55/359; 55/480; 55/481; 55/502
[58] Field of Search ............................... 55/341.1, 341.2, 55/341.3, 341.4, 341.5, 341.6, 341.7, 359, 369, 480, 481, 502, 510

[56] References Cited

U.S. PATENT DOCUMENTS

| | | |
|---|---|---|
| 3,204,390 | 9/1965 | Heyl . |
| 3,594,992 | 7/1971 | Carr et al. . |
| 3,680,285 | 8/1972 | Wellan et al. . |
| 4,028,248 | 6/1977 | Murauskas et al. ...................... 55/481 |
| 4,257,790 | 3/1981 | Bergquist et al. . |
| 4,277,260 | 7/1981 | Browing . |
| 4,382,808 | 5/1983 | Van Wormer, Jr. et al. ............. 55/480 |
| 4,435,197 | 3/1984 | Nijhawan et al. . |
| 4,544,387 | 10/1985 | Agerlid ..................................... 55/502 |
| 4,867,769 | 9/1989 | Oda et al. . |
| 5,336,405 | 8/1994 | Tang et al. ................................ 55/502 |

FOREIGN PATENT DOCUMENTS

| | | | |
|---|---|---|---|
| 704817 | 4/1941 | Germany ................................. 55/480 |
| WO-9108822 | 6/1991 | WIPO .................................... 55/341.2 |

Primary Examiner—Jay H. Woo
Assistant Examiner—Minh-Chau T. Pham
Attorney, Agent, or Firm—M. Reid Russell

[57] ABSTRACT

A cartridge filter element for installation in a plenum of a filtration housing that receives a dirty air flow and cleans that flow by flow passage through a filter material or media of the cartridge filter element, with the cleaned air then passed out of a discharge end of the cartridge filter element and vented through a clean air discharge line. The cartridge filter element includes a section of the filter material that is formed, as by rolling, into an outer cylinder and includes bands fitted therearound for maintaining its cylindrical shape. An access door, that is preferably a flat plate having four corners, is centered across the outer cylinder rear end to extend at a right angle therefrom to close off that cylinder rear end. The access door functions as both the cylinder rear end cap and provides for connection over a filter access opening that is formed into the filtration housing that receives the cartridge filter element installed therein to positioned the filter element across the filtration housing dirty air plenum. The outer cylinder also includes a forward end seal that is formed from an appropriate seal material and is maintained across the cylinder forward end for fitting, in seal engagement, into an air discharge port or opening of the filtration housing that is for discharging cleaned air into a clean air outlet. An inner core, that is preferably formed from a section of porous metal, such as steel, is rolled into a cylinder, and is longitudinally centered in the outer cylinder, between the access door and end seal to provide an open area between the opposing outer and core surfaces as a clean air plenum for distributing air over the inner cylinder or core porous surface that is pulled into to core and passes therefrom into the clean air outlet.

14 Claims, 4 Drawing Sheets

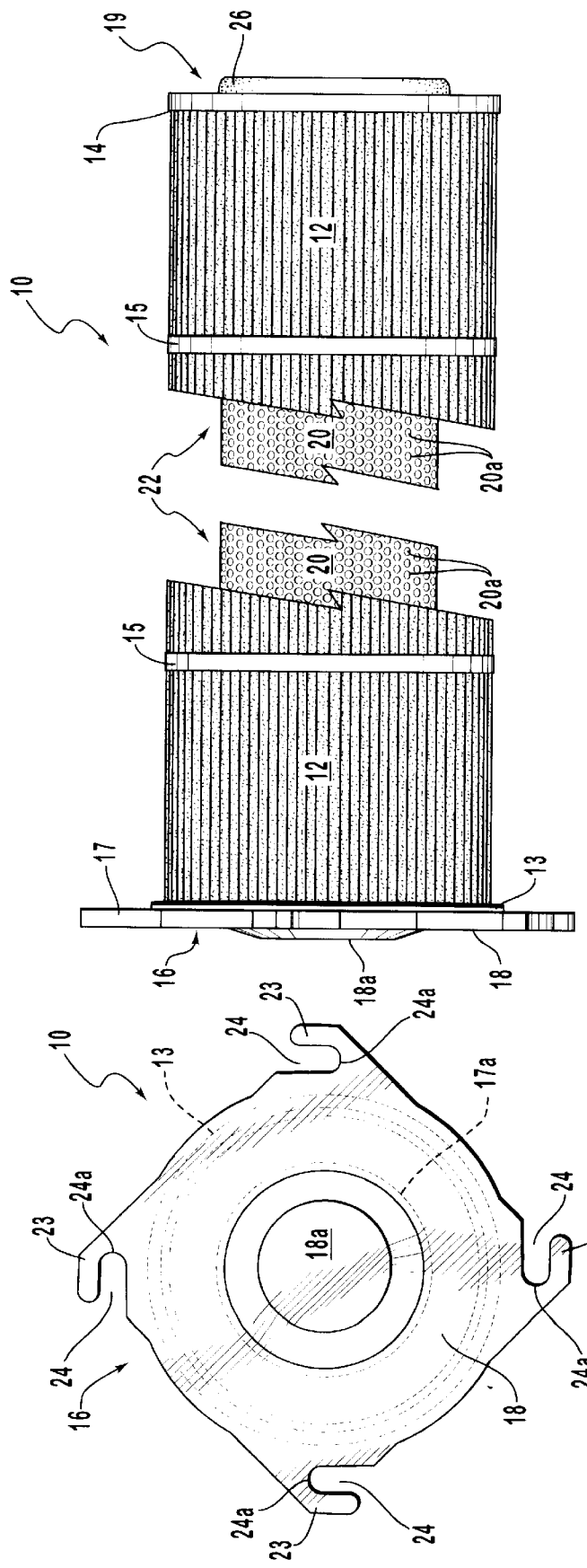

INDUSTRIAL DUST COLLECTOR AND METHOD FOR ITS USE

BACKGROUND OF THE INVENTION

1. Field of the Invention

This invention relates to cartridge filter elements and filtration housings that utilize them for removal of particulate matter from an air flow, and in particular to cartridge filter elements that are easily installed in and removed from such a filtration housing.

2. Prior Art

Dust collection systems that utilize individual replaceable cartridge filter elements where the elements is installed in a horizontal or nearly horizontal attitude are not new, and in such a housing a dirty air plenum is arranged to pass a dirty air flow through a filter outer surface that is then pulled downwardly through the cartridge to remove particulate matter from that air flow. Further, most such systems as utilize cartridge filter elements have provided some type of compressed air jet cleaning mechanism to scour collected particles off from each filter outer surface, with such dislodged materials then falling into a section of the housing that is for discharging collected materials therefrom. The present invention, however, provides a marked improvement over such earlier filters and systems by providing both a unique cartridge filter element that includes a plate secured across its rear end that is also its mounting arrangement for positioning it in a filtration housing where a flow of dirty air is directed through a dirty air inlet into a housing plenum to be pulled through cartridge filter elements of the invention. That dirty air flowing around pass through a filter media and into the cartridge interior to travel be distributed a clean air plenum that directs the flow through pores into a center core. That clean air is passed from the core to pass through a filter element end cap seal and is exhausted from the housing through a clean air outlet. The cartridge filter element of the invention and its use in an air filtration system provides a number of advantages over previous designs to include: simplified cartridge filter element fabrication and mounting where the filter end serves also as a filtration housing access door; simplified filter element and with the installation and removal from a filtration housing that allows used filter element to be conveniently removed and placed in disposal containers, with workers never having to enter a filtration housing dirty air plenum for routine servicing.

Examples of different configurations of filter elements for use in air filtration systems that involve flange mountings are shown in U.S. Patents to Wellan, et al., U.S. Pat. No. 3,680,285; to Nijhawan, et al., U.S. Pat. No. 4,435,197 and to Oda, et al., U.S. Pat. No. 4,867,769. These filter elements however, do not provide, as does the invention, a combination filter end cap and filtration housing access door where, on installation of the filter element, the access door seals to a filtration housing filter access opening with the element opposite end cap sealed to an edge of a filtration housing clean air opening wherethrough clean air is vented from the filter element to atmosphere. The cartridge filter element of the invention access door end includes a slot arrangement where the individual slots receive ends of threaded rods fitted therein that receive fasteners and are accordingly unlike the filter element flange mountings that are shown in U.S. Patents to Carr et al., U.S. Pat. No. 3,594,992 and to Bergquist, et al, U.S. Pat. No. 4,257,790. Further distinct from the invention, a U.S. Patent to Heyl U.S. Pat. No. 3,204,390 shows a filter element that is held in position by a center rod. Additionally, an arrangement of a positioning devise and cartridge filter element is shown in a U.S. Patent to Browning, U.S. Pat. No. 4,277,260, that is also unlike the cartridge filter element of the invention in both design and function.

SUMMARY OF THE INVENTION

It is a principal object of the present invention in a cartridge filter element for use in a commercial air filtration device for removing particulates form a dirty air flow to provide, as a rear filter element access door that both closes off the filter element rear end cap and provides a door to a filter access opening into a filtration housing and includes, at an open forward end, an end cap seal for providing sealing engagement with an edge of a clean air outlet opening of the filtration housing to pass cleaned air therethrough.

Another object of the present invention is to provide a cartridge filter element that is easily mounted in and dismounted from a filtration housing without a requirement for worker entry into that filtration housing.

Another object of the present invention is to provide, as a cartridge filter element mounting, a filter element rear end cap that is a plate arranged for both closing off the filter element and to act as an access door into the filtration housing, which plate includes, for mounting across a filter element access opening into the filtration housing, slots that are each formed across a plate corner as connecting lugs, with each lug slot having a diameter for passing a threaded rod therealong that extends from an edge of the filter element access opening into the filtration housing, with each threaded rod to travel along and seat at the end of each slot when the filter element is turned appropriately, with the rod ends to each receive a nut, such as a wing nut, turned thereon to engage and clamp against the lug slot edges to secure the access door across the filtration housing filter element access opening.

Still another object of the present invention is to provide a cartridge filter element that includes, on a forward end, a seal for sealing in a discharge opening from the filtration housing that is a sealing collar secured around the filter element to open a discharge opening or seat that is formed in the wall of the filtration housing dirty air plenum that opens into a clean air outlet.

Still another object of the present invention is to provide a cartridge filter element for mounting in a filtration housing as a system for cleaning particulates from a dirty air flow and to pass cleaned air into a connected clean air outlet of the filtration housing, with the cartridge filter element including an outer cylinder that is formed from a filter media and includes a perforated inner cylinder that is centered longitudinally in and is spaced apart from the outer cylinder inner surface, as a clean air plenum.

Still another object of the present invention in an air filtration system is to provide a cartridge filter element that is for individual mounting in a filtration housing to receive a flow therearound of dirty air that is directed into a housing dirty air plenum wherein are maintained the individual filter elements, which dirty air is pulled into the dirty air plenum to pass around and flow through each filter element outer cylinder that is formed from a filter media, with passage through the filter media cleans the air flow that is then passed out from an open filter element end and into a clean air outlet, with the individual filter elements arranged to be easily and conveniently installed in and removed from the filtration housing without a necessity for worker entry into the filtration housing dirty air plenum area.

Each cartridge filter element of the invention is arranged for mounting, in a filter access opening that is formed in a filtration housing that receives a dirty air flow therein for removal of entrained particulates by passage through the filter elements, cleaning that flow that is then directed out from the filtration housing through a clean air outlet. The cartridge filter element of the invention includes an outer cylinder that is formed from a selected filter material or media as will remove a large percentage of the particulate matter as is present in a dirty air flow that is directed into the filtration housing to flow around and is pulled through the filter element outer cylinder. For removing particulates from an air flow of approximately 200 cubic feet per minute that contains approximately 1.43 pounds of pollution particulates per thousand cubic foot of flow a filter material or media known as 8 oz. spun bond polyester, that is manufactured by SF Air Filtration Inc., has been used successfully as the filter media for forming the outer cylinder, for removing approximately 99.996 per cent of the particulate matter from the flow, which removed particulates remain on or fall off of the outer cylinder surface. Captured particulates as adhere to the filter element surface are preferably blown off of the filter surface as by periodically directing a compressed air flow across the surfaces of the individual filter elements to knock off particulate matter therefrom that then falls into a discharge area of the filtration housing for collection and removal.

An inner core is provided for the filter element that is preferably formed from a flat section of perforated metal that is rolled into a cylinder as a core and is centered longitudinally within the filter element outer cylinder to provide an open area between which outer cylinder interior surface and the core outer surface that functions as a clean air plenum, distributing air along the core that is pulled through the core perforations to pass therealong and out of a core open end. The filter element outer cylinder and core are individually mounted at their ends to extend at right angles from an inner surface of an access door that is a flat plate and closes off an end of the filter element to function also as an access door of the filtration housing. The end plate includes lugs that are formed as slots in the plate corners that are for receiving threaded rod ends fitted therethrough that extend outwardly at intervals from around a filter element access door or port of the filtration housing. The rod ends are to receive nuts, such as wing nuts, turned thereover after the filter access door been turned to where the rod ends travel along lug slots to the slot ends, the nuts tightened on the rod ends to urge the access door into sealing engagement with the filtration housing filter element access opening edges, sealing the filter element access door thereto.

Additional to the cartridge filter element including an access door for both closing a filter element end, the access door is also to close over a filtration housing filter access hole or opening, as set out above, each filter element includes an end seal formed as a collar of a compressible sealing material, such as closed cell neoprene foam, that maintained across the filter element open end. The sealing collar is for fitting into a seat that is formed in a clean air vent or hole as has been formed through a dirty air plenum wall of the filtration housing that opens into a clean air outlet. The sealing collar is to seal in the seat with clean air exhausted from within the filter element as has been cleaned of particulates.

DESCRIPTION OF THE DRAWINGS

In the drawings that illustrate that which is presently regarded as the best mode for carrying out the invention.

FIG. 2 is a rear end elevation view of the cartridge filter element of FIG. 1;

FIG. 3 is a side elevation view of the cartridge filter element of FIG. 1 showing the filter element broken across its center to expose a filter element perforated inner core;

DETAILED DESCRIPTION

Figure 1:
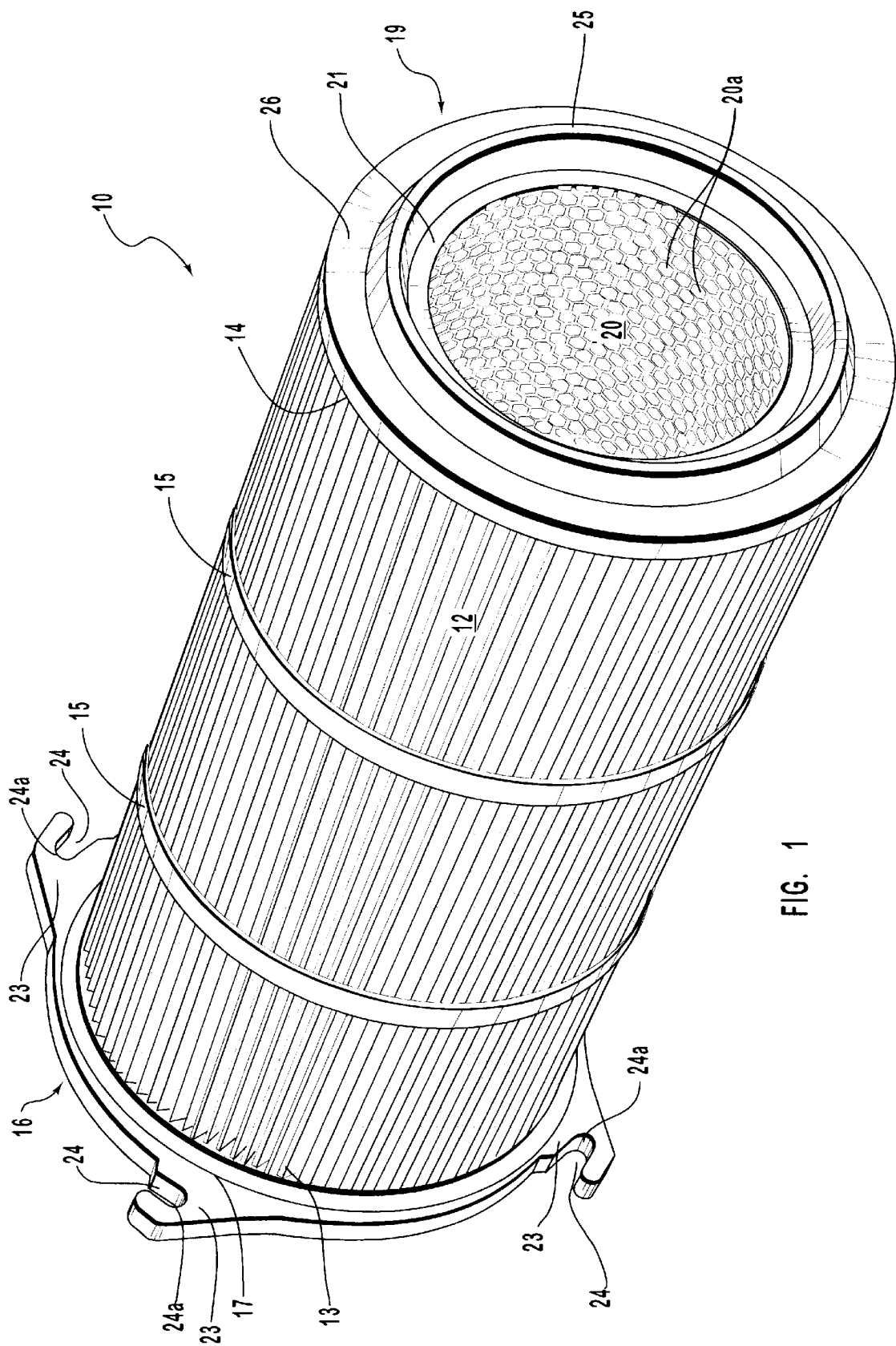
FIG. 1 is a side elevation perspective view taken from a seal end of a cartridge filter element of the invention.

FIG. 1 shows a cartridge filter element 10 of the invention, hereinafter referred to as filter element, that is closed off by a filter access door 16 secured across a rear filter end, as shown in FIG. 2, with FIG. 3 showing a side elevation view of the filter element 10 that has been broken across its center. The filter element 10 includes an outer cylinder 12 that is shown as corrugated and is preferably formed from a section of a filter material or media that has been roller into a cylinder 12 to have flat opposite rear and forward ends 13 and 14, respectively, with the cylinder rear end shown formed into a flange 13 for connection to an access door rear face 17. The filter material is maintained in its cylindrical shape by fitting bands 15 therearound. Outer cylinder 12 is formed, preferably utilizing standard manufacturing methods, and a filter material or media is selected to provide a material that is capable of removing a desired percentage of particulates as are found in a dirty air flow that is pulled through that filter material, when the filter 10 element is utilized in a filtration system that is like that illustrated by the filtration housing 30, and set out and described hereinbelow. It should, of course, be understood that the filter 10 of the invention is not limited to a utilization of any particular filter material or media. However, for purposes of this disclosure, a filter element 10, that incorporates a filter material known as 8 oz. spun bond polyester, manufactured by SF Air Filtration Inc., has been utilized as a preferred filter material or media that, in practice, has been found to remove approximately 99.996 percent of the particulates as are present in a dirty air flow, where such dirty air flow through the filter material has been approximately 200 cubic feet per minute per cartridge.

Additional to maintaining the filter material or media in a cylindrical shape as outer cylinder 12 utilizing bands 15, the outer cylinder 12 rear end 13 is connected to the center of a rear face 17 of an access door 16 so as to extend at a right angle thereto, and receives an end cap seal 19 mounted across its forward end 14. An inner cylinder or core 20, that is preferably formed from a section of perforated metal, such as steel, to be corrosion resistant and is formed into a cylinder as by rolling, is axially centered in the outer cylinder 12 and is secured at one end to also extend at a right angle from the access door 16 rear face 17, positioned in a slot 17a, that is shown in broken lines in FIG. 2. The slot 17a, as shown, is formed in the rear face 17, around a center raised section 18a of the access door 16 forward face 18. The inner cylinder or core is also connected to an end cap seal positioned just adjacent to an end cap seal 19 inner lip 21. An open area 22, as shown best in FIG. 3, is formed between the outer cylinder 12 interior surface and the surface of the core 20 that constitutes a clean air plenum for equally distributing the flow of air along the core 20 as has passed through the filter material or media. This air flow to pass through a plurality of spaced core openings 20a to travel into the center of the core, with that filtered air to then travel through the end cap seal 19 opening and into a clean air outlet 38 of the filtration housing 30, as set out hereinbelow.

The access door 16, as shown in the FIGS., is preferably formed from a flat essentially square section of a material. The material selected for access door 16 is preferably somewhat flexible to seal to, when compressed against, the edge of a filter element access opening 3 1 that has been formed into a side 32 of filtration housing 30. A preferred material for the access door 16 of the invention is aluminum but may be any suitable material, including a plastic material, to provide for close fitting against the edge of filter access opening 31, within the scope of this disclosure. The access door 16 of the invention replaces filtration housing doors as would commonly be attached to such housing as by hinges to be movable over cartridge filter element access openings that are formed in such earlier air filtration housings. The access door 16 of the invention is arranged to serve as both the filter element end cap and to close off filter access opening 31. For mounting the filter element 10, at its access door 16, into the filtration housing 30 filter access opening 31, four corners 23 of the access door 16 are slotted on the bias, as slots 24. The slots 24 each have a width to receive an end of one of four threaded rods 33 that, as shown best in FIG. 4, extend from a side wall 32 of the filtration housing 30, at equal spaced points around the edge of each of the filter access openings 31. To install a filter element 10, an operator holding the access door 16 filter end in their one hand passes the filter element 10 end cap seal 19 into the end of the filter access opening 31 to where the end cap seal engages and fits into a seat opening 36 formed through an air discharge side 35, shown in broken lines, of the filtration housing 30. Each threaded rod 33 is fitted into an open end of an access door 16 slot 24 and that access door 16 is then turned to slide the threaded rods along slots 24 and into engagement with slot ends 24a. Thereat, nuts 34, shown herein as wing nuts 34, are turned over the threaded rod ends to engage the edges of each slot 24 so as to urge the access door 16, at its corners 23, into tight fitting engagement with the surface of the filtration housing side 32, around at the edge of a filter access opening 31. In which fitting the end seal cap 19 is urged into the seat opening 36, sealing therein. During fitting of the filter 10 into the filtration housing 30 access opening 31 the end cap seal 19 is aligning with a seat opening 36, such that a seal lip 25 will pass into that seat opening. Thereafter, with the tightening of the filter access door 16 over the filter access opening 31, a flat seal surface 26 will be pressed against and into sealing engagement with the edge of the seat opening, sealing thereto. The filter element 10 of the invention is thereby sealed at its access door 16 and end cap seal 19 within the filtration housing 30, functioning as set out hereinbelow.

As set out above, the area 22 between the inner surface of outer cylinder 12 and core 20 is a clean air plenum for distributing air along the core surface as has been filtered by air passage through the filter material or media forming outer cylinder 12. This air flow is then passed through the core porous or openings 20a into the core 20 interior with that flow of cleaned air then vented out of the air outlet 38. For pulling the dirty air flow through the outer cylinder the air outlet 38 is maintained at a lesser pressure than the pressure of the dirty air flow entering the housing 30 through the inlet 32. This pressure differential can be maintained as by a fan, or the like, not shown, that is arranged downstream from the air outlet 38, to pull an air flow therethrough.

Figure 4:
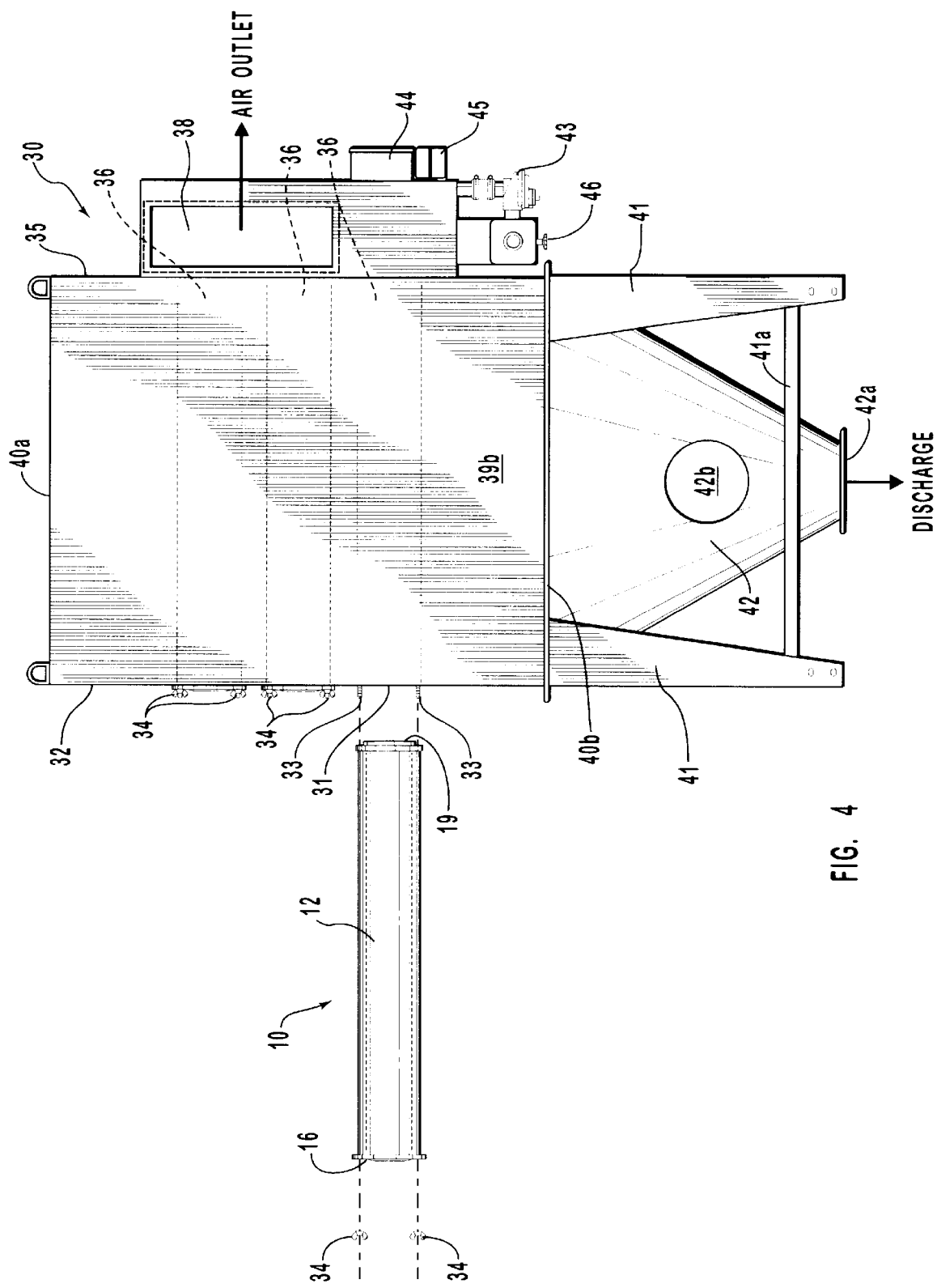
FIG. 4 is an end elevation view of a filtration housing showing a cartridge filter element of the invention exploded outwardly from a side thereof that is aligned for fitting into a filter element access opening, shown in broken lines that also includes an air outlet end, also shown also in broken line, formed in a filtration plenum housing wall that opens into a clean air outlet.
Figure 5:
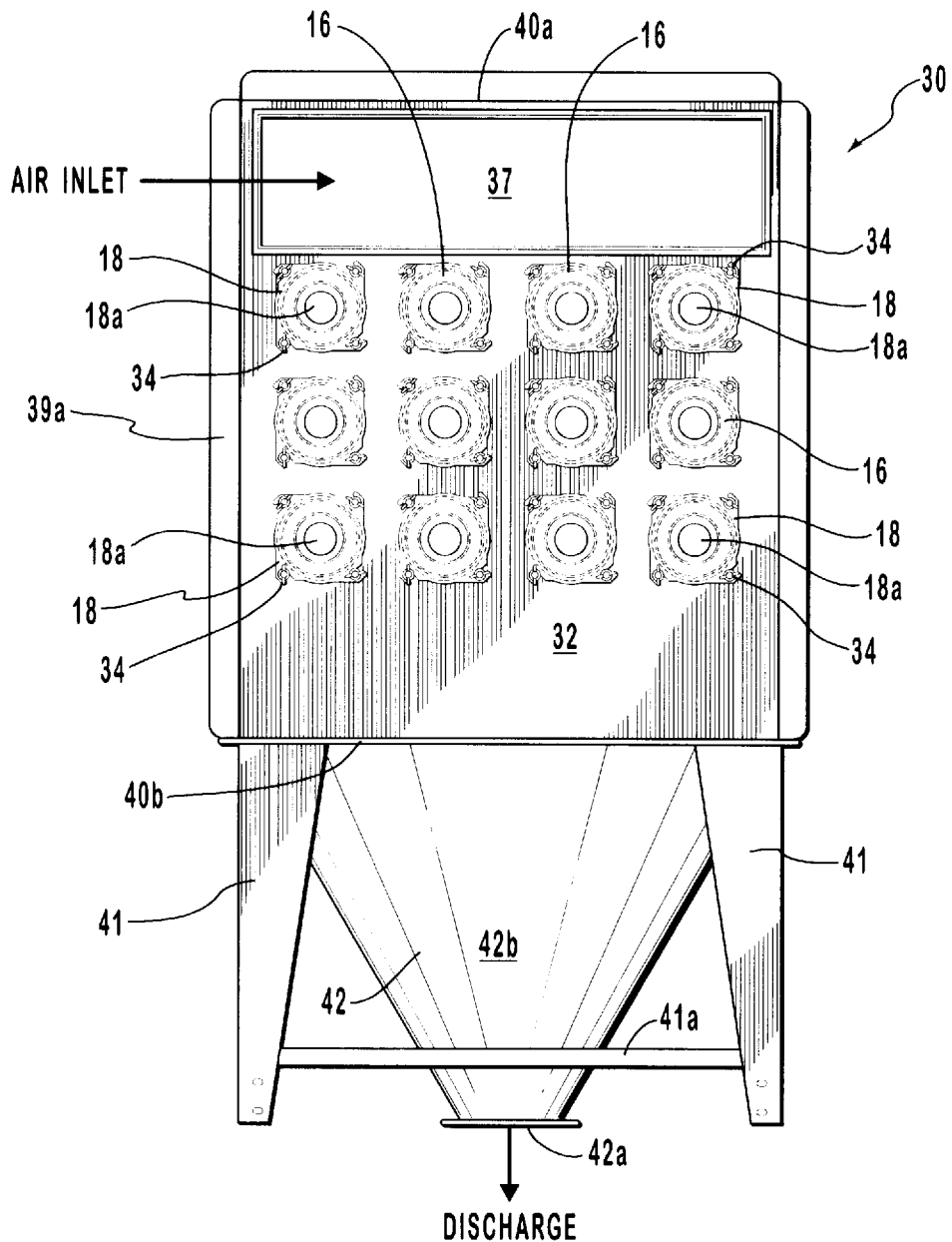
FIG. 5 is a side elevation view of the filtration housing of FIG. 4 showing a number of cartridge filter elements of the invention as have been fitted into filter element access openings, showing access door cartridge ends secured thereover and showing a dirty air inlet opening into the filtration housing.

The filtration housing 30, as shown in FIGS. 4 and 5, has a box shape that is open in its interior and is maintained on legs 41 with cross supports 41a therebetween. As shown, the filtration housing 30 has inlet side 32, wherein the access openings 31 are formed, and the discharge side 35 that include the seat openings 36, which access opening 31 and seat opening 36 are aligned. Between the sides 32 and 35 are shown sides 39a and 39b secured along common edges, with the housing 30 closed off by top and bottom sections 40a and 40b, respectively. The area within the housing 30, wherein the filter elements 10 are maintained is open as the dirty air plenum, and receives entering dirty air through air inlet 37, shown in FIG. 5. Which dirty air flow is pulled through each filter element 10 outer cylinder 12 surfaces so as to deposit particulates as are removed from that air flow on the cylinder outer surface. Accordingly, to remove collected particulates off from that outer cylinder 12 surface, a flow of air under pressure is periodically directed over that outer cylinder 12 surface to knock off collected particles that then fall towards the housing 30 bottom 40b to pass into a particulate discharge 42 and out of a neck 42a thereof, and into a collection vessel, or the like, not shown. Which housing discharge 42 preferably includes an access opening 42b, shown in FIG. 4, for providing maintenance access. To provide such flow of air under pressure to remove the particulates from the filter element 10 surface a compressed air header 43, shown in FIGS. 4, is provided for passing and directing air under pressure into the housing 30. The header 43 is preferably initiated on a timed basis on operations of a timer board, illustrated by a box 44, that is located above the air header, or upon a sensing of a diminished flow from the air outlet 38, which timing or sensing to operate a solenoid valve, illustrated as a solenoid valve enclosure 45, to open the air header 43. After a set time period operation the timer board directs closure of the solenoid valve. The compressed air flow may, of course, contain water that, as required, can be drained as by turning a header drain valve 46.

Heretofore, a worker to change cartridge filter elements in a former conventional filtration housing was often required to physically enter the housing, or the housing was arranged with a number of access doors that were individually opened to provide access for a worker to reach inside the housing to remove contaminated filter elements. With, in such removal operations, the worker often come in contact with the particulate matter coating such filter element that could create a worker exposure to dangerous chemicals. The present invention, by providing filter element 10 where the access door 16 is both a filter end cap and a filtration housing filter access opening door allows a worker to conveniently remove and replace filter elements 10 without a necessity for them to enter the filtration housing and allows for a convenient removal and placement of such filter element into a disposal container, such as a bag, with minimum worker exposure.

While a preferred arrangement of a cartridge filter element for an air filtration system of the present invention has been shown and described herein, it should be understood that the present disclosure is made by way of example only, and that changes and modifications can be made thereto without departing from the subject matter coming within the scope of the following claims and a reasonable equivalency thereof, which claims I regard as my invention.

I claim:

1. A cartridge filter element comprising, a section of a filter media for removing particulates as are contained in an air flow and is formed into an open cylinder; a closed access plate secured across a rear end of said filter medium cylinder that includes a plurality of equal spaced mounting lugs formed on the bias across edge sections of said closed access plate, which said mounting lugs each to receive a fastener means fitted therein that extend at intervals outwardly from around a filter access opening of a filtration housing that is arranged to receive a cartridge filter element fitted therein; and a seal collar means secured to a forward end of said filter media cylinder.

2. A cartridge filter element as recited in claim 1, wherein the access plate means is a flat plate having equal spaced corners and the edge sections that extend beyond the surface of the filter media, with the mounting lugs formed as slots cut on the bias into each said access plate corner, and with each said slot to receive a rod threaded end as the fastener means, which said threaded rods each extend outwardly from a location adjacent to the filtration housing filter access opening; and a nut means for turning mounting on each said bolt, against said closed access plate, mounting said closed access plate across said filter access opening.

3. A cartridge filter element as recited in claim 1, further including a porous cylindrical inner core centered longitudinally in the filter media cylinder with opposite ends of said porous cylindrical inner core secured respectively to the closed access plate and the seal collar and having a diameter to provide an open area between an inner surface of said filter media cylinder and the surface of said porous inner cylinder.

4. A cartridge filter element as recited in claim 3, wherein the cylindrical core is formed from a section of porous steel.

5. A cartridge filter element as recited in claim 3, wherein the seal collar is a disk formed from a seal material to engage and seal against an edge of an opening through a flat surface, is open through the center thereof, is flat on a rear face whereto is connected the forward end of the filter media cylinder, and which said seal collar includes a ridge means projecting outwardly form a disk forward face, extending from around said disk center opening, and is flat from a base of said ridge means to a disk outer edge.

6. A cartridge filter element as recited in claim 5, wherein the ridge means is formed to have a truncated regular triangle cross section.

7. An air filtration system comprising a cartridge filter element that includes a section of a filter media for removing particulates entrained in an air flow and is formed into an open cylinder, a closed access plate secured across a rear end of said filter medium cylinder that includes a plurality of equal spaced mounting lugs formed on the bias across edge sections of said closed access plate, and a seal collar secured to a forward end of said filter media cylinder; a filtration housing having a filter access opening for receiving said cartridge filter element fitted therein; and fastener means that extend at intervals outwardly from around said filter access opening each for fitting in one of said mounting lugs, and an air discharge opening formed in said filtration housing in alignment with said filter access opening to receive, in sealing engagement, said cartridge filter element seal collar.

8. An air filtration system as recited in claim 7, wherein the access plate means is a flat plate having equal spaced corners and the edge sections extend beyond the surface of the filter media, with the mounting lugs formed as slots cut on the bias into said access plate corner, and with each said slot to receive a rod threaded end as the fastener means, which said threaded rods each extend outwardly from a location adjacent to the filtration housing filter access opening; and a nut means for turning on each said bolt, against said closed access plate, mounting said closed access plate across said filter access opening.

9. An air filtration system as recited in claim 7, further including a porous cylindrical inner core centered longitudinally in the filter media cylinder with opposite ends of said porous cylindrical inner core secured, respectively, to the closed access plate and the seal collar and having a diameter to provide an open area between an inner surface of said filter media cylinder and the surface of said porous inner cylinder.

10. An air filtration system as recited in claim 9, wherein the cylindrical core is formed from a section of porous steel.

11. An air filtration system as recited in claim 9, wherein the seal collar is a disk formed from a seal material to engage and seal against an edge of the air discharge opening, is open through the center thereof, is flat on a rear face whereto is connected the forward end of the filter media cylinder, and which said seal collar includes a ridge means projecting outwardly from a disk forward face, extending from around said disk center opening, and is flat form a base of said ridge means to a disk outer edge.

12. An air filtration system as recited in claim 11, wherein the ridge means is formed to have a truncated regular triangle cross section.

13. An air filtration system as recited in claim 7, wherein the filtration housing includes an opening for passing a dirty air flow, is open as a dirty air plenum between the filter access opening and the air discharge opening, and said air discharge opening connects to a clean air discharge line; and means for pulling a flow of air from said dirty air plenum into said clear air discharge line.

14. An air filtration system as recited in claim 13, further including means for introducing a flow of compressed air into the filtration housing that is directed over the surface of the cartridge filter element to knock off particles of material as have collected on the surface of said cartridge filter element.

* * * * *